United States Patent Office

3,117,133
Patented Jan. 7, 1964

3,117,133
PROCESS FOR THE PRODUCTION OF SULTONES
Heinz Kothe and Karl-Josef Gardenier, Dusseldorf-Holthausen, Germany, assignors to Henkel & Cie, G.m.b.H., Dusseldorf-Holthausen, Germany
No Drawing. Filed Oct. 19, 1960, Ser. No. 63,486
Claims priority, application Germany Feb. 20, 1960
4 Claims. (Cl. 260—327)

The invention relates to a process for the manufacture of cyclic compounds containing sulfonic acids, known as sultones, and, more particularly, to a process whereby very pure products are obtained in a reaction under heat and at reduced pressure from salts of halogenated sulfonic acids.

From the investigations by Helberger, it is known that organic sulfonic acids containing a halogen atom bound to an aliphatic carbon atom, can be converted by heating at reduced pressure into cyclic compounds while splitting off hydrogen halide. These cyclic products are known as "sultones." They may be considered internal esters of the corresponding oxysulfonic acids and are extremely reactive compounds by means of which sulfonic acid radicals, promoting water-solubility, can be introduced into many different compounds. Because the reactions with sultones, in most instances, proceed without difficulties and practically quantitatively even under mild conditions, this class of compounds has attained increased importance during the last years.

The halogenated sulfonic acids, serving as starting materials for the production of sultones, can be manufactured by several methods, e.g., by sulfochlorination of alkyl halides, e.g., of butyl chloride, followed by hydrolysis of the halogen alkane sulfonic acid chlorides obtained. This process, however, suffers from disadvantages since, upon sulfochlorination, such isomers also form in considerable amounts which cannot be converted into sultones. For that reason, another process is more suitable for the production of the halogen alkane sulfonic acids, namely the equimolar reaction of alkylene dihalides with sulfite. In that process, however, the sulfonic acids do not form as free acids, but in the form of their salts. Heretofore, these salts have been converted into the free acids, e.g., by reaction with concentrated hydrochloric acid or by means of ion exchangers. Then the free acid is converted at elevated temperatures and in vacuo into the sultone.

Unexpectedly, it now has been found that the alkali salts of suitable organic sulfonic acids containing a halogen atom bound to an aliphatic carbon atom, can be converted directly into sultones by heating them to temperatures above 160° C. at reduced pressure. The sultone thereby distills in a smooth and, in most instances, substantially quantitative reaction, and the halide of the corresponding alkali metals remains. The sultones produced by this process are extremely pure.

As starting materials for the process according to the invention serve alkali salts of sulfonic acids having the generic formula

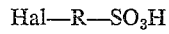

Hal—R—SO$_3$H wherein "Hal" is a halogen atom, preferably a chlorine or a bromine atom, bound to an aliphatic carbon atom, and wherein R denotes a hydrocarbon radical having at least 3 carbon atoms. This hydrocarbon radical is of such construction that the halogen atom and the sulfonic acid group are separated by at least 3 carbon atoms. The radical R may be branched or may contain a ring system.

Suitable acids, e.g., are 3-chloropropane sulfonic acid-1; 3-bromopropane sulfonic acid-1; 3-iodopropane sulfonic acid-1; 4-chlorobutane sulfonic acid-1; 3-bromobutane sulfonic acid-1; 4-bromobutane sulfonic acid-2; 1-chlorohexane sulfonic acid-4; 4-chloro-2-methylpentane sulfonic acid-2; 3-chlorooctane sulfonic acid-1; o-chloromethylbenzene sulfonic acid; 2-chloromethylnaphthaline sulfonic acid-3; and many others. Preferred are starting materials consisting of salts of halogen sulfonic acids whose structure is such that the halogen atom and the sulfonic group are separated by three or four carbon atoms because, with these acids, the sultone formation occurs especially easily. However, it also is feasible to employ as starting materials halogen sulfonic acids wherein more than 4 carbon atoms are present between the halogen atom and the sulfonic acid radical, such as, for instance, 1-bromohexane sulfonic acid-6 or 1-chlorooctane sulfonic acid-8. In these cases, it is possible that, beside sultone formation, isomerization occurs so that, either in part or totally, not the sultones corresponding to the sulfonic acids, form, but substances having 5- or 6-membered rings.

The acids named above are employed in the form of their alkali salts, preferably as sodium or potassium salts. In lieu thereof, ammonium salts also can be used, however, this has the drawback that, during the distillation of the sultone, the likewise volatile ammonium halides distill in part thus contaminating the sultone or even partially reacting therewith.

The application of the starting materials in pure form is not required. They may be contaminated, e.g., by inorganic salts or by salts of disulfonic acids. Also, mixtures of salts of different sulfonic acids can be used. The simultaneous presence of salts of such halogenated sulfonic acids which cannot be converted into sultones due to their constitution, does not interfere with carrying out the process according to the invention.

The reaction according to the invention is accomplished at reduced pressure of less than 50 mm. Hg, preferably of less than 20 mm. It is advantageous to select the pressure low enough that the sultone formed easily distills from the reaction mixture. The reaction temperature generally is above 150° C., preferably between approximately 180 and 300° C. In general, it is advantageous to select the pressure as well as the temperature as low as possible in order to forestall a discoloration of the sultone formed. However, with a good vacuum the temperature can be raised above 300° C. without substantially incurring decomposition.

In order to facilitate accelerated and uniform heating of large charges, it sometimes is opportune to admix to the starting materials substances of good heat conductivity, such as metal shavings, or to carry out heating in the presence of a high-boiling inert material which is liquid at the reaction temperatures.

By the process according to the invention, not only one process step is eliminated during the production of sultones, i.e., the conversion of salts into free acids, but also the cumbersome splitting off of free hydrogen halide is averted which requires acid-resistant equipment and pumps. Therefore, it even can be opportune to convert free halogenalkane sulfonic acids, obtained by the sulfochlorination reaction, not directly into sultones, but by way of their alkali salts according to this invention.

The invention now will be further explained by the following examples. However, it should be understood that these are given merely by way of illustration, not of limitation, and that numerous changes may be made in the details without departing from the spirit and the scope of the invention as hereinafter claimed.

*Example 1*

100 g. of the sodium salt of 3-chloropropane sulfonic acid-1 were heated in vacuo in a distillation apparatus on an oil bath. The temperature of the oil bath was raised within 4 hours from 180 to 250° C. In the receiver, 65 g. of a water-clear liquid collected which crystallized upon seeding and consisted of pure propane sultone. In the distilling flask, 35 g. of a white powder remained which consisted substantially of sodium chloride. During the distillation the pressure in the distillation apparatus was about 12 mm. Hg.

*Example 2*

100 g. of the crude sodium salt of 4-chlorobutane sulfonic acid-1, produced by the reaction of 1.4-chlorobutane with sodium sulfite and of a purity of approximately 70 percent, the remainder being essentially a mixture of the sodium salt of butane disulfonic acid-1.4 and sodium chloride, was distilled dry, as described in Example 1. The temperature of the oil bath was raised within 2 hours from 180 to 250° C. 46 g. pure butane sultone-1.4 were obtained. During the distillation the pressure in the distillation apparatus was about 18 mm. Hg.

*Example 3*

100 g. of a mixture of sodium salts of 1.3- and 1.4-chlorobutane sulfonic acids were distilled dry, as described in Example 1, at a vacuum of 1 mm. The temperature was raised to 260° C. within 3 hours. 69.2 of a mixture of butane sultone-1.3 and butane sultone-1.4 were obtained.

*Example 4*

20 g. of the sodium salt of 3-bromopropane sulfonic acid-1 were distilled dry, in the manner described in Example 1, at a vacuum of 1 mm. Hg. The temperature of the oil bath was raised from 200 to 250° C. within 2 hours. A yield of 9.7 g. pure propane sultone was obtained.

*Example 5*

20 g. of the potassium salt of 3-chloropropane sulfonic acid-1 were distilled dry at a pressure of 1 mm. Hg and at an oil bath temperature of 200 to 240° C. Within 2 hours, 11.5 g. propane sultone had distilled.

*Example 6*

By reaction of 1.4-dichlorobutane with potassium sulfite, the potassium salt of 4-chlorobutane sulfonic acid-1 was produced. 100 g. of the crude salt, containing 77 percent of the compound named and 23 percent of a mixture of potassium chloride and the potassium salt of butane disulfonic acid-1.4, were distilled dry, in the manner as described above, at a vacuum of 1 mm. The bath temperature was raised within 2 hours from 160 to 220° C. 44 g. pure butane sultone-1.4 were obtained.

*Example 7*

40.5 g. of the sodium salt of 1-oxypropane sulfonic acid-3 were evenly distributed in a glass tube of 60 cm. length and 30 mm. diameter. Then a slight current of HCl gas was conducted through the glass tube, and the contents heated for 3 hours at 190–210° C. In that manner, 44.0 g. of a grayish-white powder were obtained which contained 19.1 percent saponifiable chlorine (theoretical value for the sodium salt of chloropropane sulfonic acid: 19.67 percent).

35.2 g. of the sodium salt of 3-chloropropane sulfonic acid-1 thus prepared were distilled dry at a pressure of 0.2–0.5 mm. Hg and at an oil bath temperature of 220–260° C. 20.8 g. water-clear propane sultone distilled.

We claim as our invention:

1. The process as claimed in claim 4, wherein salts of sulfonic acids are employed in which said halogen atom is separated from said sulfonic acid radical by 4 carbon atoms.

2. The process as claimed in claim 4, wherein heating is carried out in the presence of an inert compound of high boiling point which is liquid at the reaction temperatures.

3. The process as claimed in claim 4, wherein heating is carried out in the presence of metal shavings to attain good heat conductivity.

4. A process for the production of sultones, which comprises heating a dry compound, in the absence of solvents, said compound being selected from the group consisting of alkali salts and ammonium salts of sulfonic acids having the formula $$Hal-R-SO_3H$$

wherein Hal denotes a halogen atom selected from the group consisting of chlorine and bromine, bound on an aliphatic carbon atom; and wherein R is a bivalent hydrocarbon radical selected from the group consisting of straight-chain and branched aliphatic alkylene of 3 to 8 carbon atoms, benzyl and methylnaphthyl; said bivalent hydrocarbon radical containing at least 3 carbon atoms and being of such construction that at least 3 carbon atoms separate said halogen atom from said $SO_3H$ radical; at a temperature ranging from 180° C. to 300° C. and at a reduced pressure of no more than 50 mm. Hg; and distilling the sultone thus formed.

References Cited in the file of this patent

UNITED STATES PATENTS 2,799,702     Gaertner et al. 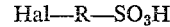 July 16, 1957

OTHER REFERENCES

Helberger et al.: Annalen, vol. 562, pages 23–35 (1949).

Helberger et al.: Annalen, vol. 565, pages 22–35 (1949).

Mustafa: Chemical Reviews, vol. 54, No. 2, pp. 195–206. 1954.

Noller: Chemistry of Organic Compounds, Second Edition, 1957, page 53.